(12) United States Patent
Asai

(10) Patent No.: US 11,146,740 B2
(45) Date of Patent: Oct. 12, 2021

(54) IMAGE DISPLAY APPARATUS

(71) Applicant: TOYOTA JIDOSHA KABUSHIKI KAISHA, Toyota (JP)

(72) Inventor: Goro Asai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/112,891

(22) Filed: Aug. 27, 2018

(65) Prior Publication Data

US 2019/0075250 A1 Mar. 7, 2019

(30) Foreign Application Priority Data

Sep. 7, 2017 (JP) .............................. JP2017-172137

(51) Int. Cl.
| | |
|---|---|
| *H04N 5/262* | (2006.01) |
| *H04N 7/18* | (2006.01) |
| *B60R 1/00* | (2006.01) |
| *H04N 5/232* | (2006.01) |
| *H04N 5/247* | (2006.01) |
| *H04N 21/47* | (2011.01) |
| *H04N 21/431* | (2011.01) |

(52) U.S. Cl.
CPC ............. *H04N 5/2624* (2013.01); *B60R 1/00* (2013.01); *H04N 5/23238* (2013.01); *H04N 5/247* (2013.01); *H04N 5/2628* (2013.01); *H04N 7/18* (2013.01); *H04N 7/181* (2013.01); *B60R 2300/105* (2013.01); *B60R 2300/303* (2013.01); *B60R 2300/306* (2013.01); *B60R 2300/605* (2013.01); *B60R 2300/8046* (2013.01); *B60R 2300/8066* (2013.01); *H04N 21/4316* (2013.01); *H04N 21/47* (2013.01)

(58) Field of Classification Search
USPC ......................................................... 348/148
See application file for complete search history.

(56) References Cited

U.S. PATENT DOCUMENTS

| | | |
|---|---|---|
| 6,593,690 B1 | 7/2003 | McCormick et al. |
| 6,593,960 B1 | 7/2003 | Sugimoto et al. |
| 6,993,159 B1 * | 1/2006 | Ishii .................. G06T 7/593 |
| | | 382/104 |

(Continued)

FOREIGN PATENT DOCUMENTS

| | | |
|---|---|---|
| CN | 106660485 A | 5/2017 |
| DE | 10 2012 001 835 A1 | 8/2013 |

(Continued)

*Primary Examiner* — Jonathan R Messmore
*Assistant Examiner* — Ana Picon-Feliciano
(74) *Attorney, Agent, or Firm* — Sughrue Mion, PLLC

(57) ABSTRACT

An image display apparatus has: a first imaging device (11B) for imaging an area on the rear of a vehicle (1); a second imaging device (11BL, 11BR) for imaging an area on the rear and side of the vehicle; a synthesizing device (12) for generating a synthesized image in which a first image captured by the first imaging device and a second image captured by the second imaging device are adjacent to each other and a vanishing point of the first image in the synthesized image is different from a vanishing point of the second image in the synthesized image; and a displaying device (13) for displaying the synthesized image.

8 Claims, 9 Drawing Sheets

(56) References Cited

U.S. PATENT DOCUMENTS

| | | | | |
|---|---|---|---|---|
| 2002/0167589 | A1* | 11/2002 | Schofield | B60N 2/002 348/148 |
| 2007/0165108 | A1* | 7/2007 | Yuasa | B60R 1/00 348/148 |
| 2014/0300743 | A1* | 10/2014 | Kumon | G06T 11/00 348/148 |
| 2015/0049193 | A1* | 2/2015 | Gupta | G03B 43/00 348/148 |
| 2016/0014406 | A1* | 1/2016 | Takahashi | G06T 7/246 348/148 |
| 2016/0267657 | A1* | 9/2016 | Gupta | H04N 17/00 |
| 2016/0277651 | A1* | 9/2016 | Sherman | H04N 5/2259 |
| 2017/0129405 | A1* | 5/2017 | Oba | B60R 1/08 |

FOREIGN PATENT DOCUMENTS

| | | |
|---|---|---|
| DE | 10 2014 006 153 A1 | 10/2015 |
| EP | 2 623 374 A1 | 8/2013 |
| JP | 2001-055100 A | 2/2001 |
| JP | 2005-328181 A | 11/2005 |
| JP | 2010-095086 A | 4/2010 |
| JP | 2013-141120 A | 7/2013 |
| JP | 2016-063352 A | 4/2016 |
| JP | 2017069852 A | 4/2017 |
| WO | WO-2015193851 A1 * | 12/2015 ............... B60R 1/00 |

\* cited by examiner

[FIG. 1]
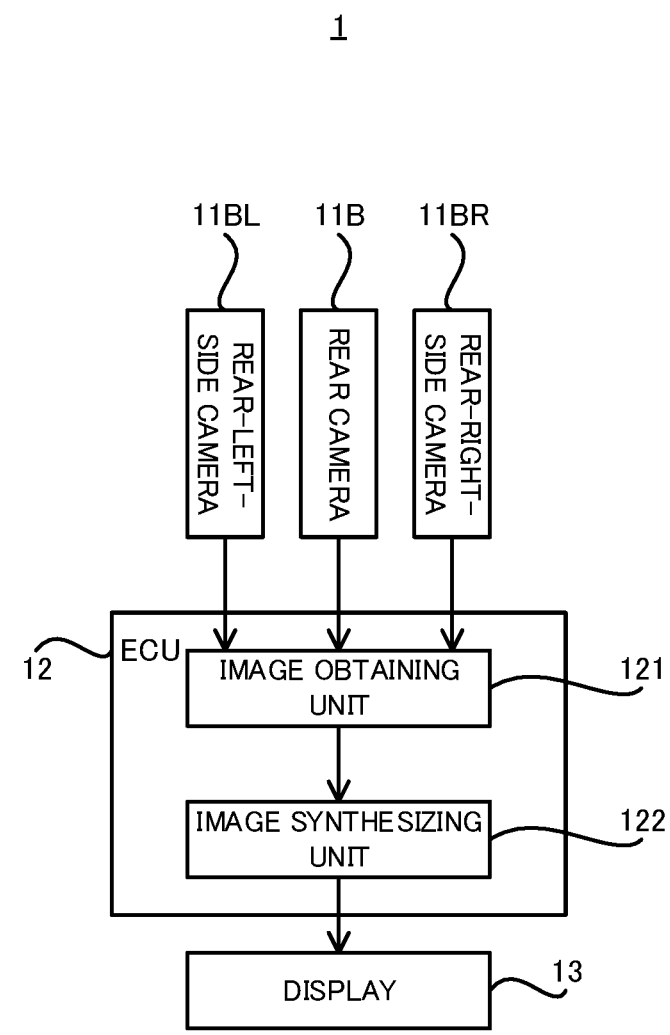

[FIG. 2]
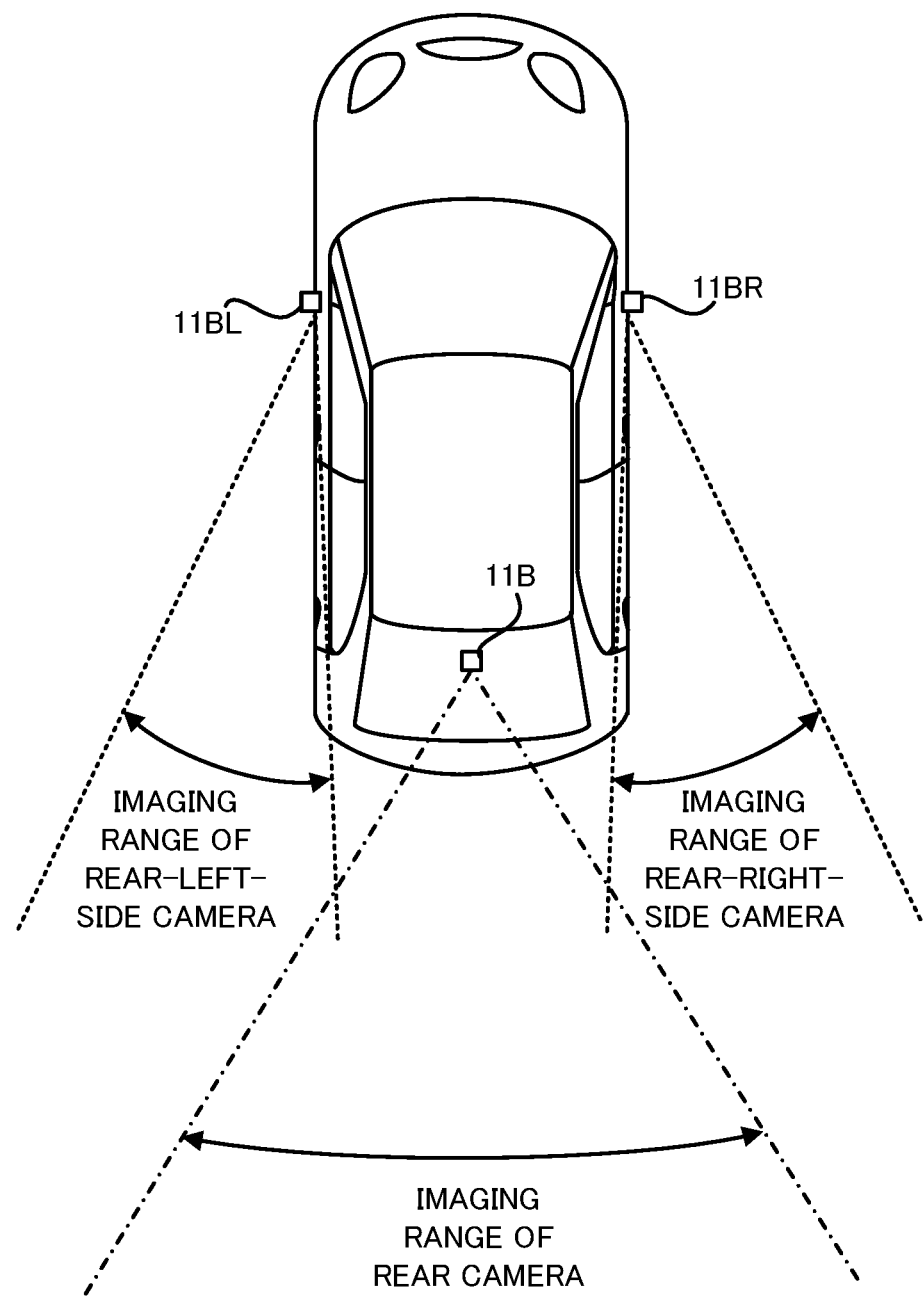

IMAGE DISPLAY APPARATUS

TECHNICAL FIELD

The present invention relates to a technical field of an image display apparatus that is configured to synthesize images that are captured by a plurality of cameras placed at a vehicle and to display the synthesized image, for example.

BACKGROUND ART

A Patent Literature 1 discloses one example of an image display apparatus. Specifically, the Patent Literature 1 discloses an image display apparatus that is configured to synthesize a left image that is captured by a left camera an imaging center of which is on the left side from the rear of a vehicle, a right image that is captured by a right camera an imaging center of which is on the right side from the rear of the vehicle and a rear image that is captured by a rear camera an imaging center of which is just on the rear of the vehicle and to display the synthesized image.

Note that there is a Patent Literature 2 as another document relating to the present invention.

CITATION LIST

Patent Literature

[Patent Literature 1] Japanese Unexamined Patent Application Publication No. 2013-141120
[Patent Literature 2] Japanese Unexamined Patent Application Publication No. 2001-055100

SUMMARY OF INVENTION

Technical Problem

The image display apparatus disclosed in the Patent Literature 1 generates the synthesized image so that a border between the rear image and each of the left image and the right image smooths. If this synthesized image is displayed, such a technical problem occurs that it is difficult for an occupant of the vehicle to intuitively perceive, from the synthesized image, a distance between the vehicle in which the occupant is and an object (for example, another vehicle) in the synthesized image. Namely, such a technical problem occurs that it is difficult for the occupant to perceive whether the object in the synthesized image is relatively distant from the vehicle (namely, the object is still on the rear of the vehicle) or the object in the synthesized image is relatively close to the vehicle (namely, the object is already on the side of the vehicle).

The above described technical problem is one example of the technical problem to be solved by the present invention. It is therefore an object of the present invention to provide, for example, an image display apparatus that is configured to synthesize images that are captured by a plurality of cameras placed at a vehicle to generate a synthesized image, and that is configured to generate the synthesized image that allows an occupant of the vehicle to perceive a distance between an object in the synthesized image and the vehicle relatively easily.

Solution to Problem

One aspect of an image display apparatus of the present invention is an image display apparatus having: a first imaging device that is configured to image an area on the rear of a vehicle; a second imaging device that is configured to image an area on the rear and side of the vehicle; a synthesizing device that is configured to generate a synthesized image in which a first image captured by the first imaging device and a second image captured by the second imaging device are adjacent to each other and a vanishing point of the first image in the synthesized image is different from a vanishing point of the second image in the synthesized image; and a displaying device that is configured to display the synthesized image.

BRIEF DESCRIPTION OF DRAWINGS

FIG. 1 is a block diagram that illustrates a structure of a vehicle in a present embodiment.

FIG. 2 is a planer view that illustrates positions at which a rear camera, a rear left camera and a rear right camera are placed, respectively, and an imaging range of each of the rear camera, the rear left camera and the rear right camera in the vehicle in the present embodiment.

DESCRIPTION OF EMBODIMENTS

Figure 3A:
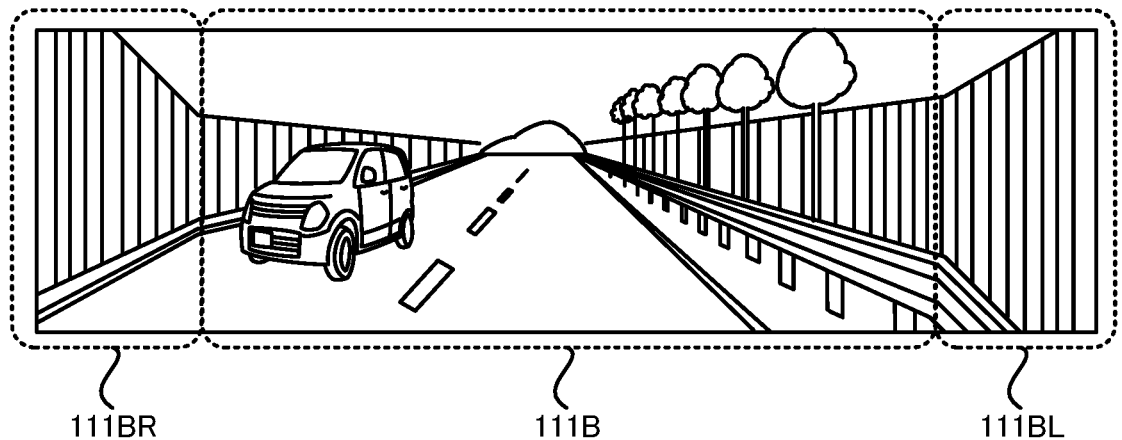
FIG. 3(a) is a planer view that illustrates a synthesized image generated by an image synthesizing process in the present embodiment and FIG. 3(b) is a planar view that illustrates a positional relationship between a vanishing point of the rear camera image and a vanishing point of each of the rear left camera image and the rear right camera image in the synthesized image generated by the image synthesizing process in the present embodiment.

Hereinafter, with reference to drawings, one embodiment of the image display apparatus of the present invention will be described. In the following description, a vehicle 1 to which one embodiment of the image display apparatus of the present invention is adapted will be described.

(1) STRUCTURE OF VEHICLE 1

Firstly, with reference to FIG. 1 and FIG. 2, the structure of the vehicle 1 in the present embodiment will be explained. FIG. 1 is a block diagram that illustrates the structure of the vehicle 1 in a present embodiment. FIG. 2 is a planer view that illustrates positions at which a rear camera 11B, a rear left camera 11BL and a rear right camera 11BR are placed, respectively, and an imaging range of each of the rear camera 11B, the rear left camera 11BL and the rear right camera 11BR in the vehicle 1 in the present embodiment. Note that the "right", the "left" and the "rear" mean the "right", the "left" and the "rear" based on a traveling direction of the vehicle 1, respectively, in the below described description, if there is no annotation.

As illustrated in FIG. 1, the vehicle 1 has: the rear camera 11B that is one example of a "first imaging device" or a "first imager" in a below described additional statement; the rear left camera 11BL that is one example of a "second imaging device" or a "second imager" in the below described additional statement; the rear right camera 11BR that is one example of a "second imaging device" or a "second imager" in the below described additional statement; an ECU (Electronic Control Unit) 12 that is one example of a "synthesizing device" or a "controller" in the below described additional statement; and a display 13 that is one example of a "displaying device" or a "display" in the below described additional statement.

The rear camera 11B is an imaging device that is configured to image (in other words, capture an image of) a rear area located on the rear of the vehicle 1 (namely, located at the backward side from the vehicle 1), as illustrated in FIG. 2. The rear area corresponds to an area including at least one portion of an area that is reflected in a back mirror placed in a vehicle interior (in other words, a cabin) of the vehicle 1, under the assumption that the back mirror is placed in the vehicle interior of the vehicle 1. Namely, the rear camera 11B is used as a substitute of the back mirror placed at the vehicle interior of the vehicle 1 and constitutes one portion of what we call an electronic mirror, in the present embodiment. An imaging center of the rear camera 11B is just on the rear of the vehicle 1, in order to image the rear area of the vehicle 1. Namely, an optical axis of an optical system such as a lens of the rear camera 11B extends backwardly and straightforwardly from the vehicle 1.

The rear left camera 11BL is an imaging device that is configured to image a rear left area located on the rear of the vehicle 1 and on the left of the vehicle 1 (namely, located at the backward side and the left side from the vehicle 1), as illustrated in FIG. 2. The rear left area corresponds to an area including at least one portion of an area that is reflected in a door mirror placed at a left door when the left door is in the closed state (in other words, the left door is closed), under the assumption that the door mirror is placed at the left door of the vehicle 1 that is placed at the left side of the vehicle 1. Namely, the rear left camera 11BL is used as a substitute of the door mirror placed at the left door of the vehicle 1 and constitutes one portion of what we call an electronic mirror, in the present embodiment. An imaging center of the rear left camera 11BL is on the left of vehicle 1 at the rear of the vehicle 1, in order to image the rear left area of the vehicle 1. In other words, the imaging center of the rear left camera 11BL is on the left of the imaging center of the rear camera 11B. Namely, an optical axis of an optical system such as a lens of the rear left camera 11BL extends backwardly at an area on the left of the above described optical axis of the optical system of the rear camera 11B. Note that the rear left area may be partially overlapped with the rear area.

The rear right camera 11BR is an imaging device that is configured to image a rear right area located on the rear of the vehicle 1 and on the right of the vehicle 1 (namely, located at the backward side and the right side from the vehicle 1), as illustrated in FIG. 2. The rear right area corresponds to an area including at least one portion of an area that is reflected in a door mirror placed at a right door when the right door is in a closed state (in other words, the right door is closed), under the assumption that the door mirror is placed at the right door of the vehicle 1 that is placed at the right side of the vehicle 1. Namely, the rear right camera 11BR is used as a substitute of the door mirror placed at the right door of the vehicle 1 and constitutes one portion of what we call an electronic mirror, in the present embodiment. An imaging center of the rear right camera 11BR is on the right of vehicle 1 at the rear of the vehicle 1, in order to image the rear right area of the vehicle 1. In other words, the imaging center of the rear right camera 11BR is on the right of the imaging center of the rear camera 11B. Namely, an optical axis of an optical system such as a lens of the rear right camera 11BR extends backwardly at an area on the right of the above described optical axis of the optical system of the rear camera 11B. Note that the rear right area may be partially overlapped with the rear area.

The ECU 12 is configured to control entire operation of the vehicle 1. Especially in the present embodiment, the ECU 12 is configured to perform a display operation for displaying, on the display 13, a rear camera image 111B, a rear left camera image 111BL and a rear right camera image 111BR. The rear camera image 111B is an image that is captured by the rear camera 11B (namely, an image indicating a circumstance of the rear area). The rear left camera image 111BL is an image that is captured by the rear left camera 11BL (namely, an image indicating a circumstance of the rear left area). The rear right camera image 111BR is an image that is captured by the rear right camera 11BR (namely, an image indicating a circumstance of the rear right area). In order to perform the display operation, the ECU 12 includes, as processing blocks that are logically realized in the ECU 12 or processing circuits that are physically realized in the ECU 12, an image obtaining unit 121 and an image synthesizing unit 122. The image obtaining unit 121 is configured to obtain the rear camera image 111B, the rear left camera image 111BL and the rear right camera image 111BR. The image synthesizing unit 122 is configured to generate a synthesized image by performing an image synthesizing process for synthesizing the rear camera image 111B, the rear left camera image 111BL and the rear right camera image 111BR. The image synthesizing process may include an observing point converting process for converting an observing point (in other words, a viewpoint) of at least one of the rear camera image 111B, the rear left camera image 111BL and the rear right camera image 111BR. The image synthesizing process may include a scaling process for scaling (in other words, expanding and/or minifying) at least one of the rear camera image 111B, the rear left camera image 111BL and the rear right camera image 111BR. The image synthesizing process may include a clipping process for clipping (in other words, extracting) a desired image portion from at least one of the rear camera image 111B, the rear left camera image 111BL and the rear right camera image 111BR. Furthermore, the image synthesizing unit 122 is configured to control the display 13 to display the generated synthesized image. Note that the display 13 is placed in the vehicle interior of the vehicle 1 and is configured to display the synthesized image to an occupant (in other words, a person or a driver) of the vehicle 1 in the vehicle interior.

Here, with reference to FIG. 3(a) and FIG. 3(b), the image synthesizing process in the present embodiment will be described. FIG. 3(a) is a planer view that illustrates the synthesized image and FIG. 3(b) is a planar view that illustrates a positional relationship between a vanishing point P1 of the rear camera image 111B and a vanishing point P2 of each of the rear left camera image 111BL and the rear right camera image 111BR in the synthesized image.

As illustrated in FIG. 3(a), the image synthesizing unit 122 generates the synthesized image in which the rear left area is on the left of the rear area and the rear right area is on the right of the rear area. Note that the "left" and the "right" means the "left" and the "right" based on the traveling direction of the vehicle 1 in the synthesized image, respectively, if there is no annotation, in the below described description. Namely, the image synthesizing unit 122 generates the synthesized image in which the rear left camera image 111BL is on the left of the rear camera image 111B and the rear right camera image 111BR is on the right of the rear camera image 111B. Note that the rear left area is on the right (namely, the right from a viewpoint of the occupant who watches the display 13) of the rear area and the rear right area is on the left (namely, the left from the viewpoint of the occupant who watches the display 13) of the rear area, in the synthesized image that is actually watched by the occupant. Namely, the rear left camera image 111BL is on the right (namely, the right from the viewpoint of the occupant who watches the display 13) of the rear camera image 111B and the rear right camera image 111BR is on the left (namely, the left from the viewpoint of the occupant who watches the display 13) of the rear camera image 111B, in the synthesized image that is actually watched by the occupant.

Figure 3B:
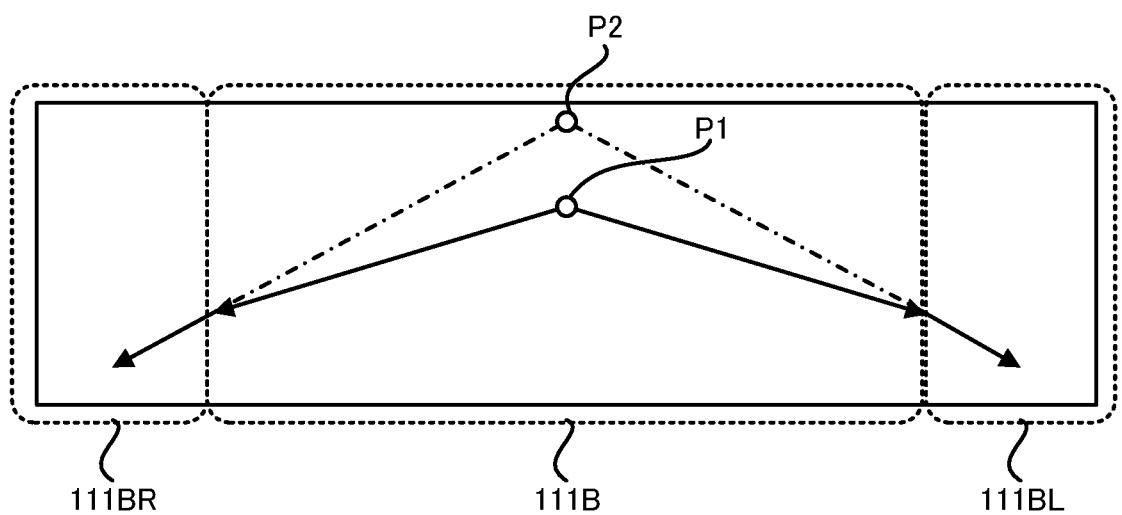

Moreover, as illustrated in FIG. 3(b), the image synthesizing unit 122 generates the synthesized image in which the vanishing point P1 of the rear camera image 111B in the synthesized image is different from the vanishing point P2 of each of the rear left camera image 111BL and the rear right camera image 111BR in the synthesized image. In an example illustrated in FIG. 3(b), the vanishing point P2 is on the rear (namely, on the rear based on the traveling direction of the vehicle 1, same applies in the below described description) of the vanishing point P1. Namely, the vanishing point P2 is located more backwardly (namely, is farther from the vehicle 1) in the synthesized image than the vanishing point P1.

(2) TECHNICAL EFFECT

Next, a technical effect of the image synthesizing process in the present embodiment will be described. If the synthesized image is generated so that the vanishing point P1 is different from the vanishing point P2, a sense of depth of the rear camera image 111B is different from a sense of depth of each of the rear left camera image 111BL and rear right camera image 111BR in the synthesized image as illustrated in FIG. 3(a). Specifically, the sense of depth of each of the rear left camera image 111BL and rear right camera image 111BR is more enhanced than the sense of depth of the rear camera image 111B. Namely, the display aspect of the rear camera image 111B is different from the display aspect of each of the rear left camera image 111BL and rear right camera image 111BR in the synthesized image. As a result, the occupant can perceive a border between the rear camera image 111B and each of the rear left camera image 111BL and rear right camera image 111BR in the synthesized image relatively easily.

Thus, the occupant can perceive relatively easily whether a rear vehicle (alternatively, any object other than the vehicle, same applies in the below described description) in the synthesized image is in a portion of the synthesized image corresponding to the rear camera image 111B or a portion of the synthesized image corresponding to the rear left camera image 111BL or the rear right camera image 111BR. Namely, the occupant can perceive relatively easily whether the rear vehicle located in the rear area, the rear left area or the rear right area is in a portion of the synthesized image corresponding to the rear camera image 111B or a portion of the synthesized image corresponding to the rear left camera image 111BL or the rear right camera image 111BR. As a result, the occupant can perceive relatively easily that the rear vehicle in the synthesized image is relatively distant from the vehicle 1 (for example, the rear vehicle is still located in the rear area that is relatively far from the vehicle 1), if the rear vehicle is in the portion of the synthesized image corresponding to the rear camera image 111B. On the other hand, the occupant can perceive relatively easily that the rear vehicle in the synthesized image is relatively close to the vehicle 1 (for example, the rear vehicle is located in the rear left area or the rear right area that is relatively close to the vehicle 1), if the rear vehicle is in the portion of the synthesized image corresponding to the rear left camera image 111BL or the rear right camera image 111BR. Namely, the occupant can perceive relatively easily whether the rear vehicle in the synthesized image is relatively distant from the vehicle 1 (for example, the rear vehicle is still located in the rear area that is relatively far from the vehicle 1) or whether the rear vehicle in the synthesized image is relatively close to the vehicle 1 (for example, the rear vehicle is located in the rear left area or the rear right area that is relatively close to the vehicle 1). Namely, the occupant can intuitively perceive (in other word, understand or figure out), from the synthesized image, a distance between the rear vehicle in the synthesized image and the vehicle 1 in which the occupant is.

Figure 4A:
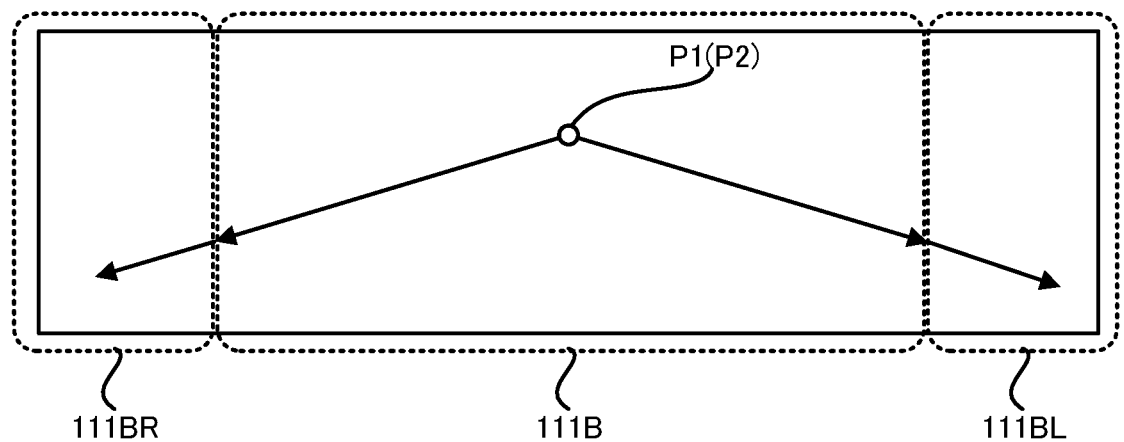
FIG. 4(a) is a planar view that illustrates a positional relationship between the vanishing point of the rear camera image and the vanishing point of each of the rear left camera image and the rear right camera image in the synthesized image generated by an image synthesizing process in a comparison example and FIG. 4(b) is a planer view that illustrates the synthesized image generated by the image synthesizing process in the comparison example.
Figure 4B:
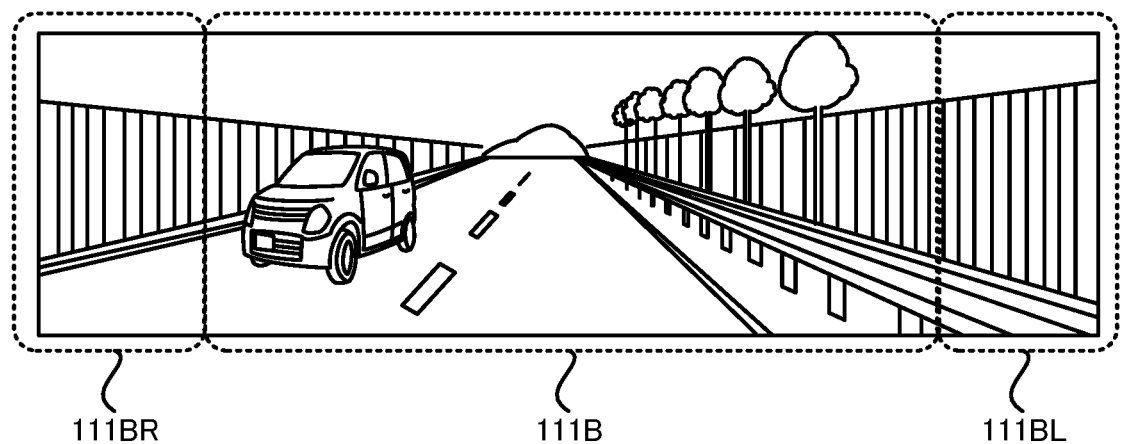

On the other hand, FIG. 4(a) illustrates the vanishing point P1 and the vanishing point P2 in the synthesized images generated by an image synthesizing process in a comparison example. As illustrated in FIG. 4(a), the image synthesizing process in the comparison example generates the synthesized image in which the vanishing point P1 of the rear camera image 111B in the synthesized image is same as the vanishing point P2 of each of the rear left camera image 111BL and the rear right camera image 111BR in the synthesized image. Note that it is assumed that the position of each of the vanishing point P1 and the vanishing point P2 in the comparison example is same as the position of the vanishing point P1 in the present embodiment. As a result, as illustrated in FIG. 4(b), the sense of depth of the rear camera image 111B is same as the sense of depth of each of the rear left camera image 111BL and rear right camera image 111BR in the synthesized image. Namely, the display aspect of the rear camera image 111B is same as the display aspect of each of the rear left camera image 111BL and rear right camera image 111BR in the synthesized image. As a result, it is difficult for the occupant to easily (in other words, intuitively) perceive the border between the rear camera image 111B and each of the rear left camera image 111BL and rear right camera image 111BR in the synthesized image.

Thus, it is difficult for the occupant to perceive easily whether the rear vehicle in the synthesized image is in the portion of the synthesized image corresponding to the rear camera image 111B or the portion of the synthesized image corresponding to the rear left camera image 111BL or the rear right camera image 111BR. As a result, it is difficult for the occupant to perceive easily that the rear vehicle in the synthesized image is relatively distant from the vehicle 1 or relatively close to the vehicle 1. Namely, it is difficult for the occupant to easily perceive, from the synthesized image, the distance between the rear vehicle in the synthesized image and the vehicle 1 in which the occupant is.

Figure 5A:
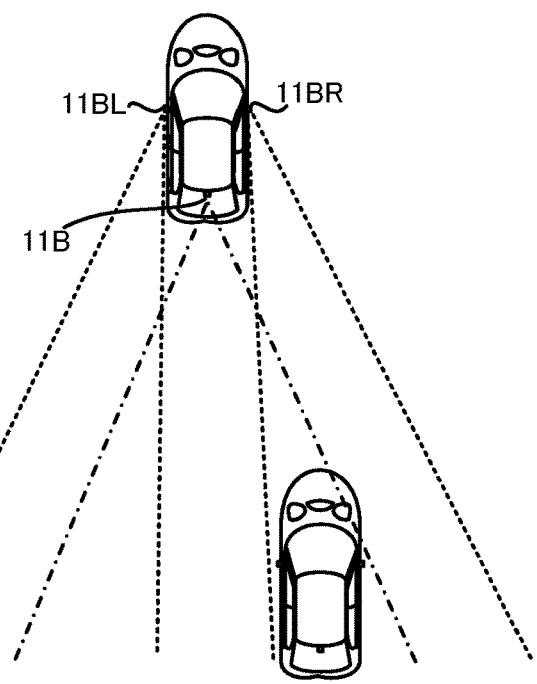
FIG. 5(a) is a planar view that illustrates a situation where a rear vehicle is relatively distant from the vehicle.
Figure 5B:
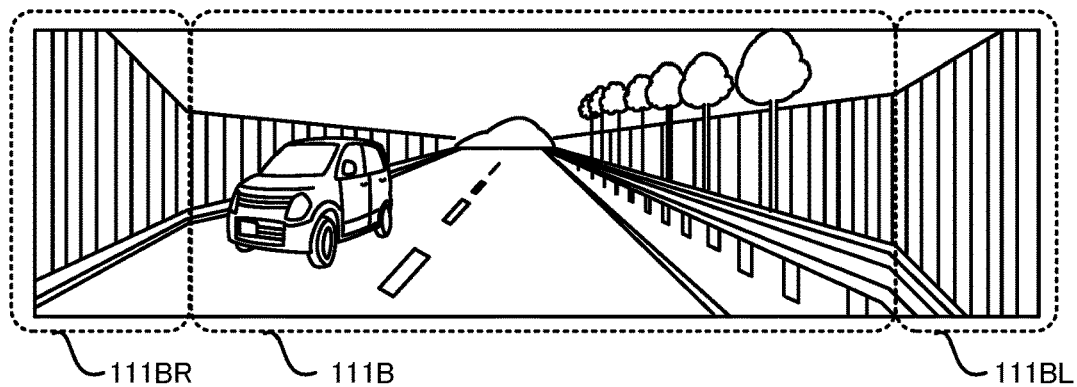
FIG. 5(b) is a planer view that illustrates the synthesized image generated by the image synthesizing process in the present embodiment when the rear vehicle is relatively distant from the vehicle.
Figure 5C:
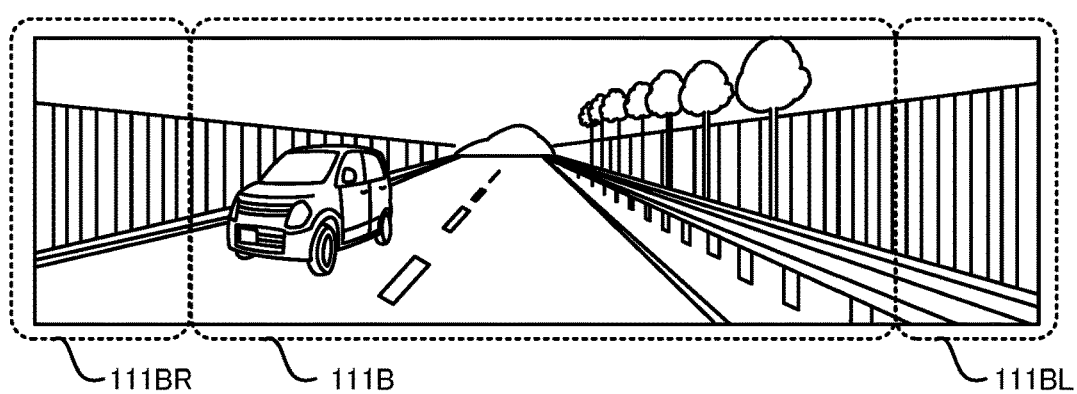
FIG. 5(c) is a planer view that illustrates the synthesized image generated by the image synthesizing process in the comparison example when the rear vehicle is relatively distant from the vehicle.
Figure 6A:
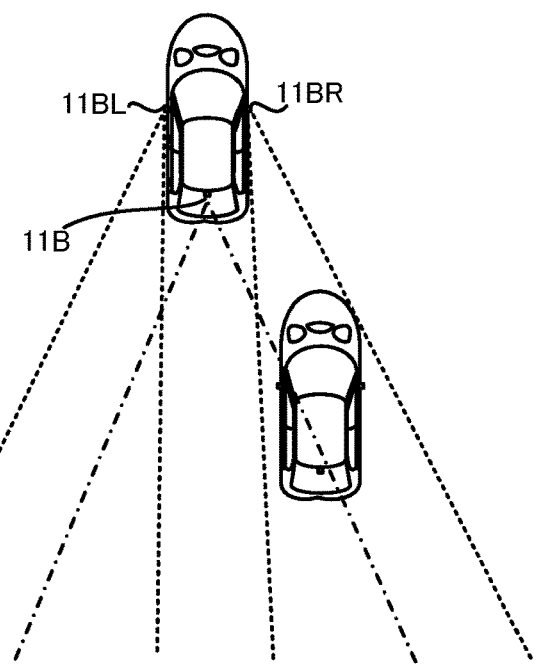
FIG. 6(a) is a planar view that illustrates a situation where the rear vehicle is relatively close to the vehicle.
Figure 6B:
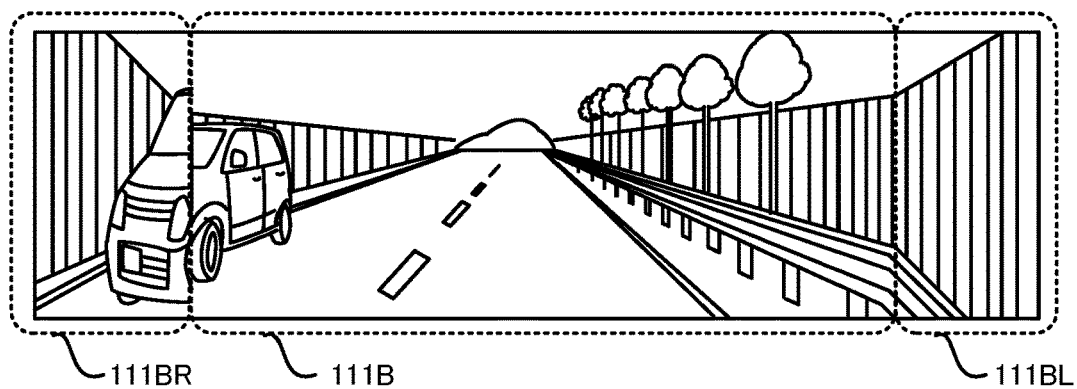
FIG. 6(b) is a planer view that illustrates the synthesized image generated by the image synthesizing process in the present embodiment when the rear vehicle is relatively close to the vehicle.
Figure 6C:
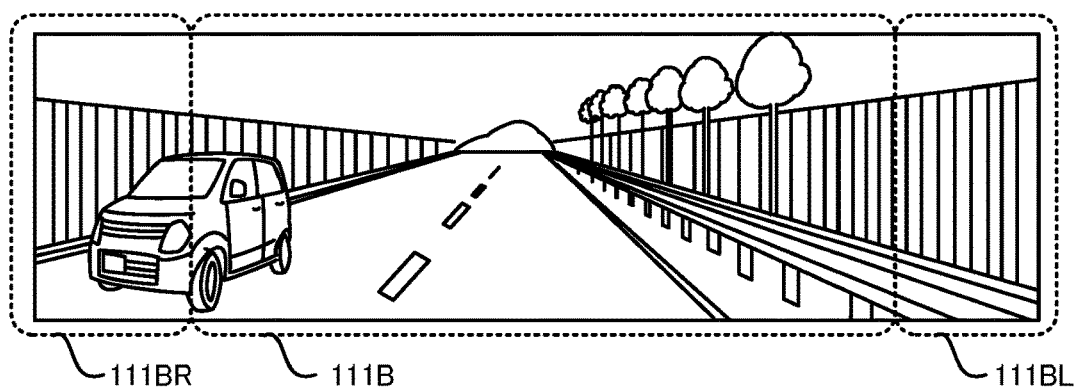
FIG. 6(c) is a planer view that illustrates the synthesized image generated by the image synthesizing process in the comparison example when the rear vehicle is relatively close to the vehicle.

Here, with reference to FIG. 5(a) to FIG. 5(c) and FIG. 6(a) to FIG. 6(c), an easiness of perceiving the distance between the rear vehicle and the vehicle 1 from the synthesized image in the present embodiment will be described. FIG. 5(a) is a planar view that illustrates a situation where the rear vehicle is relatively distant from the vehicle 1. FIG. 5(b) is a planer view that illustrates the synthesized image generated by the image synthesizing process in the present embodiment when the rear vehicle is relatively distant from the vehicle 1. FIG. 5(c) is a planer view that illustrates the synthesized image generated by the image synthesizing process in the comparison example when the rear vehicle is relatively distant from the vehicle 1. FIG. 6(a) is a planar view that illustrates a situation where the rear vehicle is relatively close to the vehicle 1. FIG. 6(b) is a planer view that illustrates the synthesized image generated by the image synthesizing process in the present embodiment when the rear vehicle is relatively close to the vehicle 1. FIG. 6(c) is a planer view that illustrates the synthesized image generated by the image synthesizing process in the comparison example when the rear vehicle is relatively close to the vehicle 1.

As illustrated in FIG. 5(a), if the rear vehicle 1 is relatively distant from the vehicle 1, there is a high possibility that most portion of the rear vehicle is located in the rear area that is relatively distant from the vehicle 1. Therefore, as illustrated in FIG. 5(b) and FIG. 5(c), there is a high possibility that the rear vehicle is in the rear camera image 111B. Then, if the rear vehicle keeps moving to approach the vehicle 1, there is a high possibility that most portion of the rear vehicle is located in the rear right area (alternatively, the rear left area) that is relatively close to the vehicle 1, as illustrated in FIG. 6(a). Therefore, as illustrated in FIG. 6(b) and FIG. 6(c), there is a high possibility that the rear vehicle is in the rear right camera image 111BR. In this case, the display aspect of one portion of the rear vehicle in the rear right camera image 111BR is absolutely different from the display aspect of another one portion of the rear vehicle in the rear camera image 111B as illustrated in FIG. 6(b), because the vanishing point P1 is different from the vanishing point P2. Thus, the occupant can perceive from the synthesized image relatively easily that the rear vehicle is relatively close to the vehicle 1. On the other hand, in the comparison example, the display aspect of one portion of the rear vehicle in the rear right camera image 111BR is same as the display aspect of another one portion of the rear vehicle in the rear camera image 111B as illustrated in FIG. 6(c), because the vanishing point P1 is same as the vanishing point P2. Thus, it is difficult for the occupant to perceive from the synthesized image relatively easily that the rear vehicle is relatively close to the vehicle 1. Therefore, the present embodiment allows the occupant to intuitively perceive, from the synthesized image, the distance between the rear vehicle (especially, the rear vehicle traveling on a driving lane that is adjacent to a driving lane on which the vehicle 1 travels) in the synthesized image and the vehicle 1 in which the occupant is more easily than the comparison example.

Moreover, in the present embodiment, the vanishing point P2 is located more backwardly (namely, is farther from the vehicle 1) than the vanishing point P1 in the synthesized image. Namely, the sense of depth of each of the rear left camera image 111BL and rear right camera image 111BR is more enhanced than the sense of depth of the rear camera image 111B. As a result, as illustrated in FIG. 5(b) and FIG. 6(b), the display 13 is allowed to display the synthesized image that is similar to a scene perceived by the occupant when the occupant actually perceives a surrounding circumstance of the vehicle 1 by using the back mirror and the door mirror, due to a visual characteristics of the occupant. Therefore, the occupant can perceive the distance between the rear vehicle in the synthesized image and the vehicle 1 more intuitively.

However, the synthesizing unit 122 may generate the synthesized image in which the vanishing point P2 is located more frontwardly (namely, is nearer to the vehicle 1) than the vanishing point P1 in the synthesized image. Namely, the synthesizing unit 122 may generate the synthesized image in which the vanishing point P2 is in front (specifically, this means front based on the traveling direction of the vehicle 1) of the vanishing point P1. Even in this case, the fact remains that the sense of depth of the rear camera image 111B is different from the sense of depth of each of the rear left camera image 111BL and rear right camera image 111BR in the synthesized image. Namely, the fact remains that the occupant can perceive the border between the rear camera image 111B and each of the rear left camera image 111BL and rear right camera image 111BR in the synthesized image relatively easily. Therefore, the fact remains that the occupant can intuitively perceive, from the synthesized image, the distance between the rear vehicle in the synthesized image and the vehicle 1 in which the occupant is.

(3) MODIFIED EXAMPLE

Next, modified examples of the image synthesizing process will be described.

(3-1) First Modified Example

Figure 7A:
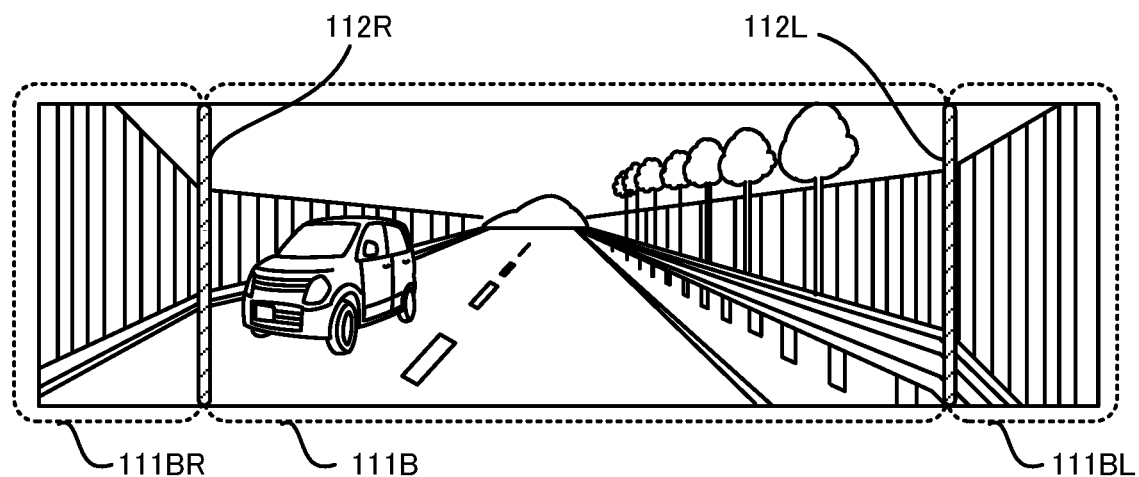
FIG. 7(a) is a planer view that illustrates the synthesized image generated by the image synthesizing process in a first modified example when the rear vehicle is relatively distant from the vehicle.
Figure 7B:
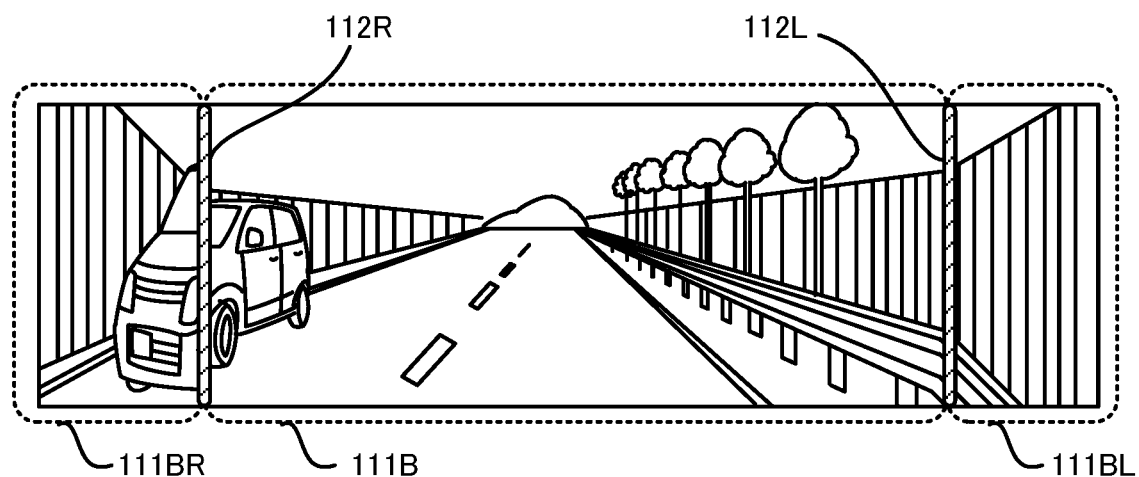
FIG. 7(b) is a planer view that illustrates the synthesized image generated by the image synthesizing process in the first modified example when the rear vehicle is relatively close to the vehicle.

Firstly, with reference to FIG. 7(a) and FIG. 7(b), a first modified example of the image synthesizing process will be described. FIG. 7(a) is a planer view that illustrates the synthesized image generated by of the first modified example of the image synthesizing process when the rear vehicle is relatively distant from the vehicle 1. FIG. 7(b) is a planer view that illustrates the synthesized image generated by the first modified example of the image synthesizing process when the rear vehicle is relatively close to the vehicle 1.

As illustrated in FIG. 7(a) and FIG. 7(b), also in the first modified example, the image synthesizing unit 122 generates the above described synthesized image (namely, the synthesized generated by synthesizing the rear camera image 111B, the rear left camera image 111BL and the rear right camera image 111BR so that the vanishing point P1 is different from the vanishing point P2).

Especially in the first modified example, the image synthesizing unit 122 generates the synthesized image that includes a border image 112L. The border image 112L indicates (in other words, represents) the border between the rear camera image 111B and the rear left camera image 111BL in the synthesized image. The border image 112L may be any image as long as the border image 112L is capable of visually indicating the border between the rear camera image 111B and the rear left camera image 111BL in the synthesized image. In an example illustrated in FIG. 7(a) and FIG. 7(b), the border image 112L is a liner-shaped (in other words, bar-shaped) image that extends along the border between the rear camera image 111B and the rear left camera image 111BL.

Moreover, the image synthesizing unit 122 generates the synthesized image that includes a border image 112R. The border image 112R indicates (in other words, represents) the border between the rear camera image 111B and the rear right camera image 111BR in the synthesized image. The border image 112R may be any image as long as the border image 112R is capable of visually indicating the border between the rear camera image 111B and the rear right camera image 111BR in the synthesized image. In an example illustrated in FIG. 7(a) and FIG. 7(b), the border image 112R is a liner-shaped (in other words, bar-shaped) image that extends along the border between the rear camera image 111B and the rear right camera image 111BR.

As a result of the synthesized image including the above described border images 112L and 112R being displayed, the occupant can perceive the border between the rear camera image 111B and each of the rear left camera image 111BL and rear right camera image 111BR in the synthesized image more easily (alternatively, more surely). Thus, the occupant can perceive, from the synthesized image, the distance between the rear vehicle in the synthesized image and the vehicle 1 in which the occupant is more easily.

(2-1) Second Modified Example

Next, a second modified example of the image synthesizing process will be described. In the second modified example, the image synthesizing unit 122 generates the synthesized image that includes the border images 112L and 112R, as with the first modified example. However, in the second modified example, the image synthesizing unit 122 may generate the synthesized image that includes at least one of the border images 112L and 112R if a predetermined condition is satisfied, and may generate the synthesized image that does not include the border images 112L and 112R if the predetermined condition is not satisfied. As a result, it is possible to display the synthesized image while reducing the bothersome feeling of the occupant who may have the bothersome feeling to the border images 112L and 112R being always displayed, compared to the case the synthesized image including the border images 112L and 112R is always generated.

A distance condition relating to the distance between the rear vehicle in the synthesized image and the vehicle 1 may be used as one example of the predetermined condition. For example. a first example of the distance condition that the distance between the rear vehicle in the synthesized image and the vehicle 1 is smaller than a first threshold value may be used as one example of the predetermined condition. In this case, the image synthesizing unit 122 may generate the synthesized image that includes at least the border image 112L, if the distance between the rear vehicle located in the rear left area and the vehicle 1 is smaller than the first threshold value. On the other hand, the image synthesizing unit 122 may generate the synthesized image that includes at least the border image 112R, if the distance between the rear vehicle located in the rear right area and the vehicle 1 is smaller than the first threshold value.

When the first example of the distance condition is used as the predetermined condition, the image synthesizing unit 122 generates the synthesized image that includes at least one of the border images 112L and 112R if the distance between the rear vehicle and the vehicle 1 is smaller than the first threshold value. On the other hand, the image synthesizing unit 122 generates the synthesized image that does not include the border images 112L and 112R if the distance between the rear vehicle and the vehicle 1 is not smaller than the first threshold value. As a result, the occupant can perceive that the rear vehicle is relatively close to the vehicle 1, if at least one of the border images 112L and 112R is displayed in the synthesized image. On the other hand, the occupant can perceive that the rear vehicle is relatively distant from the vehicle 1, if the border images 112L and 112R is not displayed in the synthesized image. Thus, the occupant can perceive the distance between the rear vehicle in the synthesized image and the vehicle 1 in which the occupant is more easily.

Moreover, when the rear vehicle in the synthesized image is relatively close to the vehicle 1 (namely, the distance between the rear vehicle and the vehicle 1 is smaller than the first threshold value), the occupant should pay more attention to the rear vehicle. If the first example of the distance condition is used as the predetermined condition, at least one of the border images 112L and 112R is displayed when the rear vehicle in the synthesized image is relatively close to the vehicle 1. Thus, the occupant can perceive relatively easily that the rear vehicle moves from the rear area of the vehicle 1 to the rear left area or the rear right area of the vehicle and thus is relatively close to the vehicle 1 by watching at least one of the border images 112L and 112R that is visually outstanding. Namely, the occupant can pay more attention to the vehicle that is relatively close to the vehicle 1 by watching at least one of the border images 112L and 112R that is visually outstanding. Particularly, when the rear vehicle is relatively close to the vehicle 1, there is a high possibility that the rear vehicle is at a position that is relatively close to the border between the rear camera image 111B and the rear left camera image 111BL or the rear right camera image 111BR or the rear vehicle straggles this border in the synthesized image. Thus, if at least one of the border images 112L and 112R is displayed under this situation, the occupant can perceive at least one of the border images 112L and 112R as well as the rear vehicle relatively surely. Thus, the occupant can pay more attention to the rear vehicle.

Note that the image synthesizing unit 122 uses the distance between the rear vehicle and the vehicle 1 in order to perform the image synthesizing process in the second modified example. Thus, it is preferable that the vehicle 1 have a detection apparatus that is configured to detect the distance between the rear vehicle and the vehicle 1. A radar, a Lidar (Light Detection and Ranging) and the like is one example of the detection apparatus. Alternatively, the image synthesizing unit 122 may calculate the distance between the rear vehicle and the vehicle 1 by performing an image process on at least one of the rear camera image 111B, the rear left camera image 111BL and the rear right camera image 111BR. Same applies the below described third modified example and fourth modified example in which the distance between the rear vehicle and the vehicle 1 is used in order to perform the image synthesizing process.

(3-3) Third Modified Example

Figure 8A:
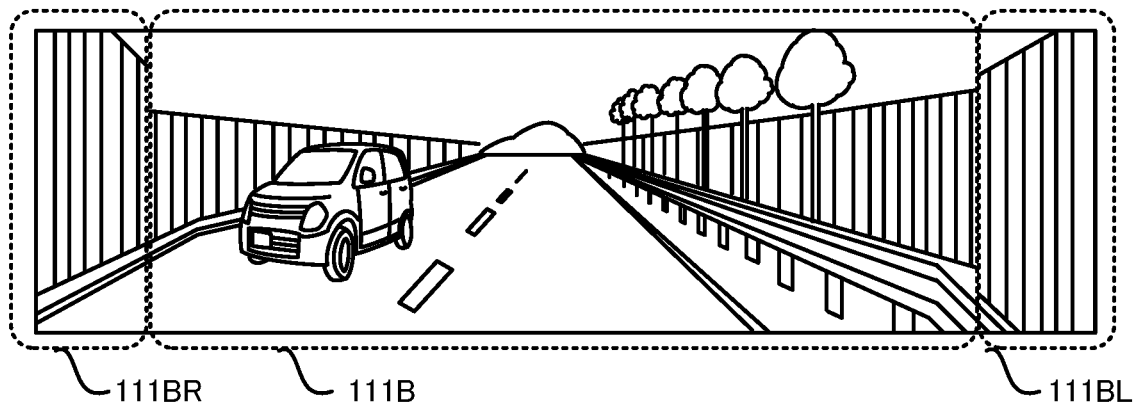
FIG. 8(a) is a planer view that illustrates the synthesized image generated by the image synthesizing process in a third modified example when the rear vehicle is relatively distant from the vehicle.
Figure 8B:
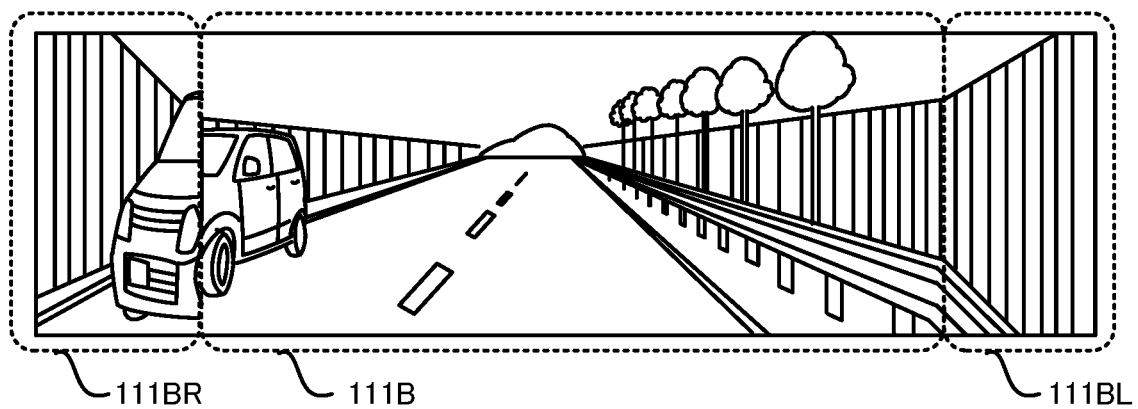
FIG. 8(b) is a planer view that illustrates the synthesized image generated by the image synthesizing process in the third modified example when the rear vehicle is relatively close to the vehicle.

Next, with reference to FIG. 8(a) and FIG. 8(b), a third modified example of the image synthesizing process will be described. FIG. 8(a) is a planer view that illustrates the synthesized image generated by of the third modified example of the image synthesizing process when the rear vehicle is relatively distant from the vehicle 1. FIG. 8(b) is a planer view that illustrates the synthesized image generated by the third modified example of the image synthesizing process when the rear vehicle is relatively close to the vehicle 1.

As illustrated in FIG. 8(a) and FIG. 8(b), also in the third modified example, the image synthesizing unit 122 generates the above described synthesized image (namely, the synthesized generated by synthesizing the rear camera image 111B, the rear left camera image 111BL and the rear right camera image 111BR so that the vanishing point P1 is different from the vanishing point P2).

Especially in the third modified example, the image synthesizing unit 122 generates the synthesized image so that a proportion (in other words, a ratio or a percentage) of an area in which at least one of the rear camera image 111B, the rear left camera image 111BL and the rear right camera image 111BR is displayed in the synthesized image is changed on the basis of the distance between the rear vehicle in the synthesized image and the vehicle 1.

For example, the image synthesizing unit 122 may generate the synthesized image so that the proportion of the area in which the rear camera image 111B is displayed in the synthesized image becomes smaller as the distance between the rear vehicle in the synthesized image and the vehicle 1 is smaller. In other words, the image synthesizing unit 122 may generate the synthesized image so that the proportion of the area in which at least one of the rear left camera image 111BL and the rear right camera image 111BR is displayed in the synthesized image becomes larger as the distance between the rear vehicle in the synthesized image and the vehicle 1 is smaller. More specifically, the image synthesizing unit 122 may generate the synthesized image so that the proportion of the area in which the rear left camera image 111BL is displayed in the synthesized image becomes larger as the distance between the rear vehicle located in the rear left area and the vehicle 1 is smaller. On the other hand, the image synthesizing unit 122 may generate the synthesized image so that the proportion of the area in which the rear right camera image 111BR is displayed in the synthesized image becomes larger as the distance between the rear vehicle located in the rear right area and the vehicle 1 is smaller.

Alternatively, for example, the image synthesizing unit 122 may generate the synthesized image so that the proportion of the area in which the rear camera image 111B is displayed in the synthesized image becomes smaller when the distance between the rear vehicle in the synthesized image and the vehicle 1 is smaller than a second threshold value, compared to the case where the distance between the rear vehicle in the synthesized image and the vehicle 1 is not smaller than the second threshold value. In other words, the image synthesizing unit 122 may generate the synthesized image so that the proportion of the area in which at least one of the rear left camera image 111BL and the rear right camera image 111BR is displayed in the synthesized image becomes larger when the distance between the rear vehicle in the synthesized image and the vehicle 1 is smaller than the second threshold value, compared to the case where the distance between the rear vehicle in the synthesized image and the vehicle 1 is not smaller than the second threshold value. More specifically, the image synthesizing unit 122 may generate the synthesized image so that the proportion of the area in which the rear left camera image 111BL is displayed in the synthesized image becomes larger when the distance between the rear vehicle located in the rear left area and the vehicle 1 is smaller than the second threshold value, compared to the case where the distance between the rear vehicle located in the rear left area and the vehicle 1 is not smaller than the second threshold value. On the other hand, the image synthesizing unit 122 may generate the synthesized image so that the proportion of the area in which the rear right camera image 111BR is displayed in the synthesized image becomes larger when the distance between the rear vehicle located in the rear right area and the vehicle 1 is smaller than the second threshold value, compared to the case where the distance between the rear vehicle located in the rear right area and the vehicle 1 is not smaller than the second threshold value. Note that the second threshold value may be same as or different from the above described first threshold value used in the second modified example.

According to the above described third modified example, the occupant can perceive the distance between the rear vehicle and the vehicle 1 more easily on the basis of the proportion of the area in which at least one of the rear camera image 111B, the rear left camera image 111BL and the rear right camera image 111BR is displayed in the synthesized image. For example, the occupant can perceive that the rear vehicle is relatively close to the vehicle 1 if the area in which at least one of the rear left camera image 111BL and the rear right camera image 111BR is displayed in the synthesized image is relatively large (alternatively, the area in which the rear camera image 111B is displayed in the synthesized image is relatively small). On the other hand, the occupant can perceive that the rear vehicle is relatively distant from the vehicle 1 if the area in which at least one of the rear left camera image 111BL and the rear right camera image 111BR is displayed in the synthesized image is relatively small (alternatively, the area in which the rear camera image 111B is displayed in the synthesized image is relatively large).

Moreover, when the rear vehicle is relatively close to the vehicle 1, it is preferable that the occupant pay more attention to the rear vehicle, compared to the case where the rear vehicle is relatively distant from the vehicle 1. Considering this point, the third modified example enlarges the proportion of the area in which at least one of the rear left camera image 111BL and the rear right camera image 111BR in which the rear vehicle is likely to be displayed when the rear vehicle is relatively close to the vehicle 1, in order to allow the occupant to perceive the rear vehicle 1 more surely. As a result, the occupant can pay more attention to the rear vehicle that is relatively close to the vehicle 1.

(3-4) Fourth Modified Example

Figure 9A:
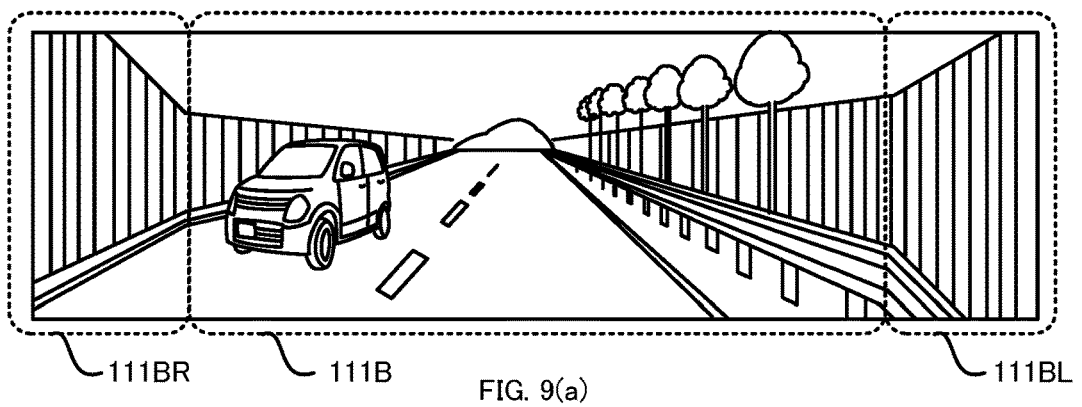
FIG. 9(a) is a planer view that illustrates the synthesized image generated by the image synthesizing process in a fourth modified example when the rear vehicle is relatively distant from the vehicle.
Figure 9B:
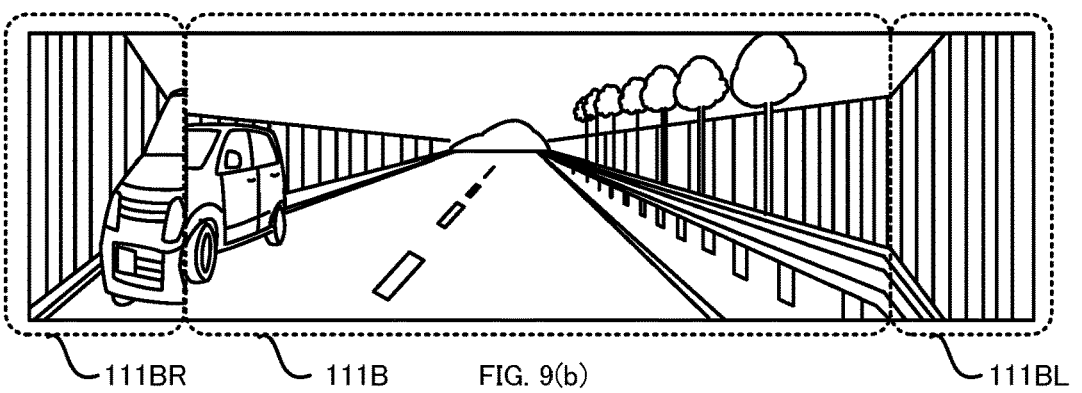
FIG. 9(b) is a planer view that illustrates the synthesized image generated by the image synthesizing process in the fourth modified example when the rear vehicle is relatively close to the vehicle.
Figure 9C:
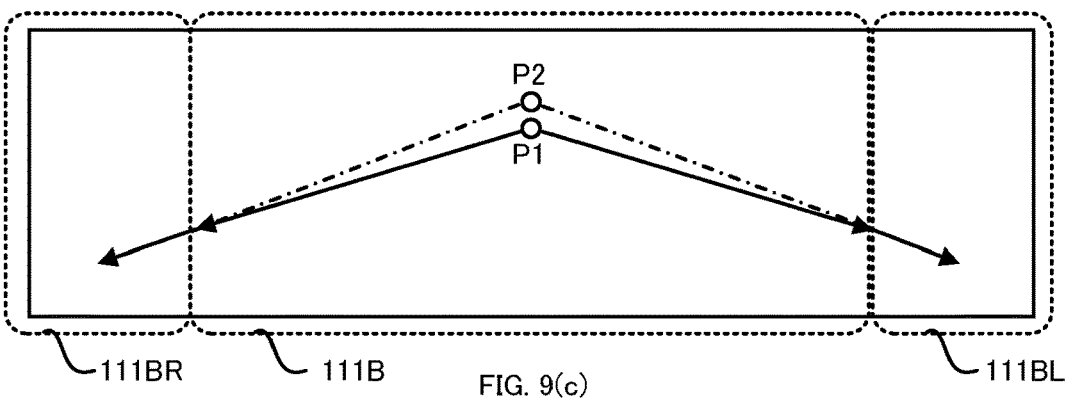
FIG. 9(c) is a planer view that illustrates the vanishing points set by the image synthesizing process in the fourth modified example when the rear vehicle is relatively distant from the vehicle.
Figure 9D:
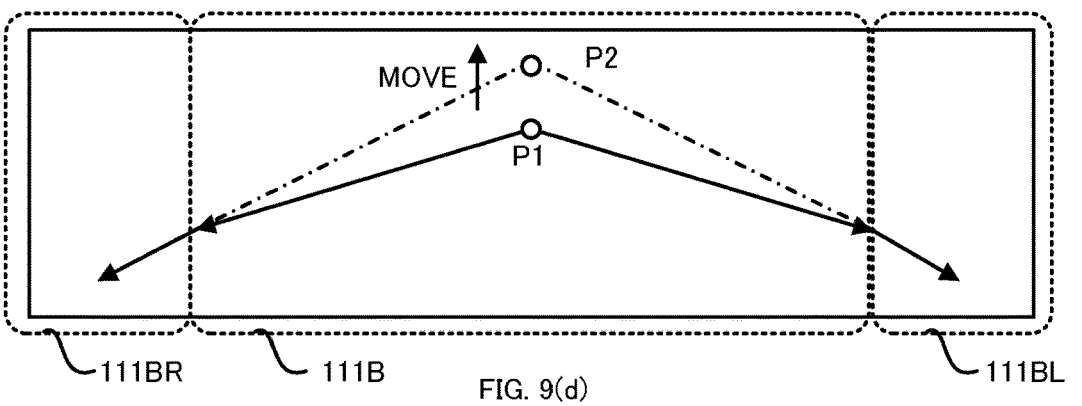
FIG. 9(d) is a planer view that illustrates the vanishing points set by the image synthesizing process in the fourth modified example when the rear vehicle is relatively close to the vehicle.

Next, with reference to FIG. 9(a) to FIG. 9(d), a fourth modified example of the image synthesizing process will be described. FIG. 9(a) is a planer view that illustrates the synthesized image generated by the fourth modified example of the image synthesizing process when the rear vehicle is relatively distant from the vehicle 1. FIG. 9(b) is a planer view that illustrates the synthesized image generated by the fourth modified example of the image synthesizing process when the rear vehicle is relatively close to the vehicle 1. FIG. 9(c) is a planer view that illustrates the vanishing points set by the fourth modified example of the image synthesizing process when the rear vehicle is relatively distant from the vehicle 1. FIG. 9(d) is a planer view that illustrates the vanishing points set by the fourth modified example of the image synthesizing process when the rear vehicle is relatively close to the vehicle 1.

As illustrated in FIG. 9(a) and FIG. 9(b), also in the fourth modified example, the image synthesizing unit 122 generates the above described synthesized image (namely, the synthesized generated by synthesizing the rear camera image 111B, the rear left camera image 111BL and the rear right camera image 111BR so that the vanishing point P1 is different from the vanishing point P2).

Especially in the fourth modified example, the image synthesizing unit 122 generates the synthesized image so that at least one of the vanishing points P1 and P2 is changed on the basis of the distance between the rear vehicle in the synthesized image and the vehicle 1, as illustrated in FIG. 9(c) and FIG. 9(d).

For example, the image synthesizing unit 122 may generate the synthesized image so that the vanishing point P1 is farther from the vanishing point P2 as the distance between the rear vehicle in the synthesized image and the vehicle 1 is smaller. Note that FIG. 9(c) illustrates a situation where the vanishing point P1 is not so far from the vanishing point P2 because the distance between the rear vehicle in the synthesized image and the vehicle 1 is not so small. FIG. 9(d) illustrates a situation where the vanishing point P1 is far from the vanishing point P2 to some extent because the distance between the rear vehicle in the synthesized image and the vehicle 1 is small to some extent. In an example illustrated in FIG. 9(c) and FIG. 9(d), the image synthesizing unit 122 changes (namely, moves) the vanishing point P2. However, the image synthesizing unit 122 may change (namely, move) the vanishing point P1 in addition to or instead of the vanishing point P1.

Alternatively, for example, the image synthesizing unit 122 may generate the synthesized image so that the vanishing point P1 is farther from the vanishing point P2 when the distance between the rear vehicle in the synthesized image and the vehicle 1 is smaller than a third threshold value, compared to the case where the distance between the rear vehicle in the synthesized image and the vehicle 1 is not smaller than the third threshold value. Note that FIG. 9(c) illustrates a situation where the vanishing point P1 is not so far from the vanishing point P2 because the distance between the rear vehicle in the synthesized image and the vehicle 1 is not smaller than the third threshold value. FIG. 9(d) illustrates a situation where the vanishing point P1 is far from the vanishing point P2 to some extent because the distance between the rear vehicle in the synthesized image and the vehicle 1 is smaller than the third threshold value. Note that the third threshold value may be same as or different from the above described first threshold value used in the second modified example and the above described second threshold value used in the third modified example.

According to the above described fourth modified example, the occupant can perceive the distance between the rear vehicle and the vehicle 1 more easily on the basis of at least one of the vanishing points P1 and P2 in the synthesized image. Namely, the occupant can perceive the distance between the rear vehicle and the vehicle 1 more easily on the basis of the difference between the display aspect (for example, the sense of depth) of the rear camera image 111B in the synthesized image and the display aspect (for example, the sense of depth) of each of the rear left camera image 111BL and the rear right camera image 111BR in the synthesized image.

Moreover, according to the fourth modified example, the vanishing point P1 is farther from the vanishing point P2 as the rear vehicle is close to the vehicle 1 more. Alternatively, the vanishing point P1 is farther from the vanishing point P2 when the rear vehicle is relatively close to the vehicle 1. Thus, if the rear vehicle is close to the vehicle 1, the occupant can perceive the border between the rear camera image 111B and each of the rear left camera image 111BL and the rear right camera image 111BR easily. As a result, the occupant can perceive whether the rear vehicle in the synthesized image is in a portion of the synthesized image corresponding to the rear camera image 111B or in a portion of the synthesized image corresponding to the rear left camera image 111BL or the rear right camera image 111BR under the situation where the occupant should pay more attention to the rear vehicle because the vehicle in the synthesized image is relatively close to the vehicle 1. Namely, the occupant can perceive, from the synthesized image, the distance between the rear vehicle in the synthesized image and the vehicle 1 more easily.

Note that the image synthesizing unit 122 may change the vanishing point P2 so that the vanishing point P2 is farther from the vehicle 1 in the synthesized image as the distance between the rear vehicle in the synthesized image and the vehicle 1 is smaller. Note that the vanishing point P2 illustrated in FIG. 9(d) (namely, the vanishing point P2 set when the distance between the rear vehicle and the vehicle 1 is relatively small) is farther from the vehicle 1 in the synthesized image than the vanishing point P2 illustrated in FIG. 9(c) (namely, the vanishing point P2 set when the distance between the rear vehicle and the vehicle 1 is relatively larger) is. If this synthesized image is generated, it is possible to display the synthesized image that is allowed to more emphasize that the rear vehicle is on the side of the vehicle 1 as the rear vehicle in the synthesized image is close to the vehicle more, as illustrated in FIG. 9(a) and FIG. 9(b). Thus, the occupant can perceive the distance between the rear vehicle in the synthesized image and the vehicle 1 more easily.

(4) ADDITIONAL STATEMENT

Relating to the above described embodiment, following additional statements will be disclosed.

(4-1) Additional Statement 1

An image display apparatus according to the additional statement 1 is an image display apparatus having: a first imaging device that is configured to image an area on the rear of a vehicle; a second imaging device that is configured to image an area on the rear and side of the vehicle; a synthesizing device that is configured to generate a synthesized image in which a first image captured by the first imaging device and a second image captured by the second imaging device are adjacent to each other and a vanishing point of the first image in the synthesized image is different from a vanishing point of the second image in the synthesized image; and a displaying device that is configured to display the synthesized image.

Alternatively, an image display apparatus according to the additional statement 1 may be an image display apparatus having a first imager that is configured to image an area on the rear of a vehicle; a second imager that is configured to image an area on the rear and side of the vehicle; a controller that is programmed to generate a synthesized image in which a first image captured by the first imager and a second image captured by the second imager are adjacent to each other and a vanishing point of the first image in the synthesized image is different from a vanishing point of the second image in the synthesized image; and a display that is configured to display the synthesized image.

When the image display apparatus according to the additional statement 1 is used, since the vanishing point of the first image in the synthesized image is different from the vanishing point of the second image in the synthesized image, an occupant (in other words, a person or a driver) of the vehicle can perceive a border between the first image and the second image more clearly, compared to the case where the vanishing point of the first image in the synthesized image is same as from the vanishing point of the second image in the synthesized image (namely, the case where the border between the first image and the second image smooths). Thus, the occupant can perceive whether an object (for example, another vehicle) in the synthesized image is in an area in the synthesized image corresponding to the first image or in an area in the synthesized image corresponding to the second image relatively easily. As a result, the occupant can perceive whether the object in the synthesized image is relatively distant from the vehicle (namely, the object is still on the rear of the vehicle) or the object in the synthesized image is relatively close to the vehicle (namely, the object already moves to an area on the side of the vehicle from an area on the rear of the vehicle or is approaching the vehicle) relatively easily. Namely, the occupant can intuitively perceive (in other word, understand or figure out), from the synthesized image, a distance between the object in the synthesized image and the vehicle in which the occupant is.

(4-2) Additional Statement 2

An image display apparatus according to the additional statement 2 is the image display apparatus according to the additional statement 1, wherein the synthesizing device is configured to generate the synthesized image in which the vanishing point of the second image in the synthesized image is farther from the vehicle in the synthesized image than the vanishing point of the first image in the synthesized image is.

Alternatively, an image display apparatus according to the additional statement 2 may be the image display apparatus according to the additional statement 1, wherein the controller is programmed to generate the synthesized image in which the vanishing point of the second image in the synthesized image is farther from the vehicle in the synthesized image than the vanishing point of the first image in the synthesized image is.

The image display apparatus according to the additional statement 2 generates the synthesized image that is similar to a scene perceived by the occupant when the occupant actually perceives a surrounding circumstance of the vehicle by using a back mirror and a door mirror, due to a visual characteristics of the occupant. Thus, the occupant can perceive, from the synthesized image, the distance between the object in the synthesized image and the vehicle in which the occupant is more intuitively. Thus, the above described technical effect can be achieved by the image display apparatus according to the additional statement 2.

(4-3) Additional Statement 3

An image display apparatus according to the additional statement 3 is the image display apparatus according to the additional statement 1 or 2, wherein the synthesizing device is configured to generate the synthesized image that includes a border image indicating a border between the first image and the second image.

Alternatively, an image display apparatus according to the additional statement 3 may be the image display apparatus according to the additional statement 1 or 2, wherein the controller is programmed to generate the synthesized image that includes a border image indicating a border between the first image and the second image.

The image display apparatus according to the additional statement 3 allows the occupant to perceive the border between the first image and the second image more clearly. Thus, the above described technical effect can be achieved by the image display apparatus according to the additional statement 3.

(4-4) Additional Statement 4

An image display apparatus according to the additional statement 4 is the image display apparatus according to the additional statement 3, wherein the synthesizing device is configured to generate the synthesized image that does not include the border image, if a distance between an object in the synthesized image and the vehicle is larger than a predetermined threshold value, and the synthesizing device is configured to generate the synthesized image that includes the border image, if the distance is smaller than the predetermined threshold value.

Alternatively, an image display apparatus according to the additional statement 4 may be the image display apparatus according to the additional statement 3, wherein the controller is programmed to generate the synthesized image that does not include the border image, if a distance between an object in the synthesized image and the vehicle is larger than a predetermined threshold value, and the controller is programmed to generate the synthesized image that includes the border image, if the distance is smaller than the predetermined threshold value.

The image display apparatus according to the additional statement 4 allows the occupant to perceive that the object in the synthesized image is relatively close to the vehicle, if the border image is displayed in the synthesized image. On the other hand, the image display apparatus according to the additional statement 4 allows the occupant to perceive that the object in the synthesized image is relatively distant from the vehicle, if the border image is not displayed in the synthesized image. Thus, the occupant can perceive the distance between the object in the synthesized image and the vehicle in which the occupant is more intuitively.

Moreover, when the object in the synthesized image is relatively close to the vehicle, the occupant should pay more attention to the object. In this situation, the occupant can pay more attention to the object that is relatively close to the vehicle by recognizing the border image, which is not included in the synthesized image when the object is relatively distant from the vehicle.

(4-5) Additional Statement 5

An image display apparatus according to the additional statement 5 is the image display apparatus according to any one of the additional statements 1 to 4, wherein the synthesizing device is configured to change a proportion of an area in which the first image is displayed in the synthesized image and a proportion of an area in which the second image is displayed in the synthesized image on the basis of a distance between an object in the synthesized image and the vehicle in generating the synthesized image.

Alternatively, an image display apparatus according to the additional statement 5 may be the image display apparatus according to any one of the additional statements 1 to 4, wherein the controller is programmed to change a proportion of an area in which the first image is displayed in the synthesized image and a proportion of an area in which the second image is displayed in the synthesized image on the basis of a distance between an object in the synthesized image and the vehicle in generating the synthesized image.

The image display apparatus according to the additional statement 5 allows the occupant to more intuitively perceive the distance between the object in the synthesized image and the vehicle in which the occupant is on the basis of the proportion of the area in which the first image is displayed in the synthesized image and the proportion of the area in which the second image is displayed in the synthesized image.

(4-6) Additional Statement 6

An image display apparatus according to the additional statement 6 is the image display apparatus according to the additional statement 5, wherein the synthesizing device is configured to change the proportion of the area in which the second image is displayed in the synthesized image so that the proportion of the area in which the second image is displayed in the synthesized image becomes larger as the distance becomes smaller.

Alternatively, an image display apparatus according to the additional statement 6 may be the image display apparatus according to the additional statement 5, wherein the controller is programmed to change the proportion of the area in which the second image is displayed in the synthesized image so that the proportion of the area in which the second image is displayed in the synthesized image becomes larger as the distance becomes smaller.

The image display apparatus according to the additional statement 6 allows the occupant to perceive that the object in the synthesized image is relatively close to the vehicle, if the area in which the second image is displayed in the synthesized image is relatively large. On the other hand, the image display apparatus according to the additional statement 6 allows the occupant to perceive that the object in the synthesized image is relatively distant from the vehicle, if the area in which the second image is displayed in the synthesized image is relatively small. Thus, the occupant can perceive the distance between the object in the synthesized image and the vehicle in which the occupant is more intuitively.

Moreover, when the object in the synthesized image is relatively close to the vehicle, the occupant should pay more attention to the object in the synthesized image, compared to the case where the object in the synthesized image is relatively distant from the vehicle. Considering this point, the image display apparatus according to the additional statement 6 enlarges the proportion of the area in which the second image is displayed and in which the object is likely to be included when the object in the synthesized is relatively close to the vehicle, in order to allow the occupant to perceive the object more surely. As a result, the occupant can pay more attention to the object that is relatively close to the vehicle.

(4-7) Additional Statement 7

An image display apparatus according to the additional statement 7 is the image display apparatus according to any one of the additional statements 1 to 6, wherein the synthesizing device is configured to change the vanishing point of at least one of the first image and the second image in the synthesized image on the basis of a distance between an object in the synthesized image and the vehicle in generating the synthesized image.

Alternatively, an image display apparatus according to the additional statement 7 may be the image display apparatus according to any one of the additional statements 1 to 6, wherein the controller is programmed to change the vanishing point of at least one of the first image and the second image in the synthesized image on the basis of a distance between an object in the synthesized image and the vehicle in generating the synthesized image.

The image display apparatus according to the additional statement 7 allows the occupant to more intuitively perceive the distance between the object in the synthesized image and the vehicle in which the occupant is on the basis of the vanishing point of at least one of the first image and the second image (namely, a display aspect, such as a sense of depth, of at least one of the first image and the second image in the synthesized image).

(4-8) Additional Statement 8

An image display apparatus according to the additional statement 8 is the image display apparatus according to the additional statement 7, wherein the synthesizing device is configured to change the vanishing point of at least one of the first image and the second image in the synthesized image so that the vanishing point of the first image is farther from the vanishing point of the second image in the synthesized image as the distance becomes smaller.

Alternatively, an image display apparatus according to the additional statement 8 may be the image display apparatus according to the additional statement 7, wherein the controller is programmed to change the vanishing point of at least one of the first image and the second image in the synthesized image so that the vanishing point of the first image is farther from the vanishing point of the second image in the synthesized image as the distance becomes smaller.

The image display apparatus according to the additional statement 8 allows the vanishing point of the first image to be farther from the vanishing point of the second image as the object in the synthesized image is relatively close to the vehicle more. Thus, the occupant can perceive the border between the first image and the second image more easily as the object in the synthesized image is relatively close to the vehicle more. As a result, the occupant can perceive whether the object in the synthesized image is in a portion of the synthesized image corresponding to the first image or in a portion of the synthesized image corresponding to the second image under the situation where the occupant should pay more attention to the object in the synthesized image because the object is relatively close to the vehicle. Namely, the occupant can perceive, from the synthesized image, the distance between the object in the synthesized image and the vehicle in which the occupant is more easily.

(4-9) Additional Statement 9

An image display apparatus according to the additional statement 9 is the image display apparatus according to the additional statement 7 or 8, wherein the synthesizing device is configured to change the vanishing point of the second image so that the vanishing point of the second image in the synthesized image is farther from the vehicle in the synthesized image as the distance becomes smaller.

Alternatively, an image display apparatus according to the additional statement 9 may be the image display apparatus according to the additional statement 7 or 8, wherein the controller is programmed to change the vanishing point of the second image so that the vanishing point of the second image in the synthesized image is farther from the vehicle in the synthesized image as the distance becomes smaller.

The image display apparatus according to the additional statement 9 is capable of displaying the synthesized image that is allowed to more emphasize that the object in the synthesized image is on the side of the vehicle as the object is close to the vehicle more. Thus, the occupant can perceive the distance between the object in the synthesized image and the vehicle in which the occupant is more easily.

Moreover, as a result of the vanishing point of the second image in the synthesized image being farther from the vehicle in the synthesized image as the distance becomes smaller, the vanishing point of the second image in the synthesized image is farther from the vanishing point of the first image in the synthesized image. Thus, the above described technical effect achieved by the image display apparatus according to the additional statement 8 is also achieved by the image display apparatus according to the additional statement 9.

At least one portion of the feature in the above described embodiment may be eliminated or modified accordingly. At least one feature in the above described embodiment may be combined with another one feature in the above described embodiment.

This application is based upon and claims the benefit of priority of the prior Japanese Patent Application No. 2017-172137, filed on Sep. 7, 2017, the entire contents of which are incorporated herein by reference. In addition, the entire contents of the above described Patent Literatures 1 to 2 are incorporated herein by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention. An image display apparatus, which involve such changes, are also intended to be within the technical scope of the present invention.

REFERENCE SIGNS LIST

1 vehicle
11B rear camera
11BL rear left camera
11BR rear right camera
12 ECU
121 image obtaining unit
122 image synthesizing unit
13 display
111B rear camera image
111BL rear left camera image
111BR rear right camera image
112L, 112R border image
P1, P2 vanishing point

The invention claimed is:

1. An image display apparatus comprising:
a first imager that is configured to image an area on the rear of a vehicle;
a second imager that is configured to image an area on the rear and side of the vehicle;
a controller that is programmed to generate a synthesized image in which a first image captured by the first imager and a second image captured by the second imager are adjacent to each other and a vanishing point of the first image in the synthesized image is different from a vanishing point of the second image in the synthesized image; and
a display that is configured to display the synthesized image, wherein
the controller is programmed to generate the synthesized image in which the vanishing point of the second image is set at a first position in the synthesized image in order to enhance a sense of depth of the second image more than a sense of depth of the first image, and
the first position is higher than a second position in the synthesized image at which the vanishing point of the first image is set.

2. The image display apparatus according to claim 1, wherein
the controller is programmed to generate the synthesized image that includes a border image indicating a border between the first image and the second image.

3. The image display apparatus according to claim 2, wherein
the controller is programmed to generate the synthesized image that does not include the border image, if a distance between the vehicle and an object, existing in the area on the rear of the vehicle or the area on the rear and side of the vehicle, is larger than a predetermined threshold value, and
the controller is programmed to generate the synthesized image that includes the border image, if the distance is smaller than the predetermined threshold value.

4. The image display apparatus according to claim 1, wherein
the controller is programmed to change a proportion of an area in which the first image is displayed in the synthesized image and a proportion of an area in which the second image is displayed in the synthesized image on the basis of a distance between the vehicle and an object, existing in the area on the rear of the vehicle or the area on the rear and side of the vehicle, in generating the synthesized image.

5. The image display apparatus according to claim 4, wherein
the controller is programmed to change the proportion of the area in which the second image is displayed in the synthesized image so that the proportion of the area in which the second image is displayed in the synthesized image becomes larger as the distance becomes smaller.

6. The image display apparatus according to claim 1, wherein
the controller is programmed to change the vanishing point of at least one of the first image and the second image in the synthesized image on the basis of a distance between an object in the synthesized image and the vehicle in generating the synthesized image.

7. The image display apparatus according to claim 6, wherein
the controller is programmed to change the vanishing point of at least one of the first image and the second image in the synthesized image so that the vanishing point of the first image is farther from the vanishing point of the second image in the synthesized image as the distance becomes smaller.

8. The image display apparatus according to claim 6, wherein
the controller is programmed to change the vanishing point of the second image so that the vanishing point of the second image in the synthesized image is farther from the vehicle in the synthesized image as the distance becomes smaller.

* * * * *